Aug. 27, 1963

A. F. UHLIG 3,101,848

CONTAINER HANDLING APPARATUS

Filed March 15, 1961

INVENTOR.
ALBERT F. UHLIG
BY
W. A. Schaich
and J. R. Nelson
ATTORNEYS

INVENTOR.
ALBERT F. UHLIG
BY
W. A. Schaich
and J. R. Nelson
ATTORNEYS

United States Patent Office 3,101,848
Patented Aug. 27, 1963

3,101,848
CONTAINER HANDLING APPARATUS
Albert F. Uhlig, Oakland, Calif., assignor to Owens-Illinois Glass Company, a corporation of Ohio
Filed Mar. 15, 1961, Ser. No. 95,975
19 Claims. (Cl. 209—72)

My invention relates to container handling apparatus.

In the manufacture of glass bottles and jars it is conventional practice to convey them, following annealing, through inspection and/or gauging zones, or stations, where they are checked for defects or imperfections, such as crizzles, choked necks, excessively out-of-round bodies or necks and the like.

An object of my invention is the provision of a novel, simple, yet highly efficient apparatus capable of ready attachment to a conventional conveyor for automatically selectively removing bottles or jars from the conveyor, gauging, or inspecting such removed articles, and returning to the conveyor only those containers which are within specified tolerances and otherwise suitable for marketing.

A further object of my invention is the provision of apparatus of the above character in which an endless belt performs the two-fold function of advancing bottles or jars to and beyond an inspecting station and rotating such articles at said station for inspecting or gauging purposes.

It is also an object of my invention to provide handling apparatus of the above character which incorporates means for holding and rotating a bottle or jar at a selected point for gauging or inspecting purposes and novel means timed operationally with the holding and rotating means to hold back following articles during rotation and inspection of the lead bottle or jar.

It is likewise an object of my invention to provide novel apparatus of the above character in which cams carried by a common shaft and secured thereto in predetermined relationship control the cycle of operation of the major elements.

Other objects will be in part apparent and in part pointed out hereinafter.

In the accompanying drawings forming a part of my application:

Figure 1:
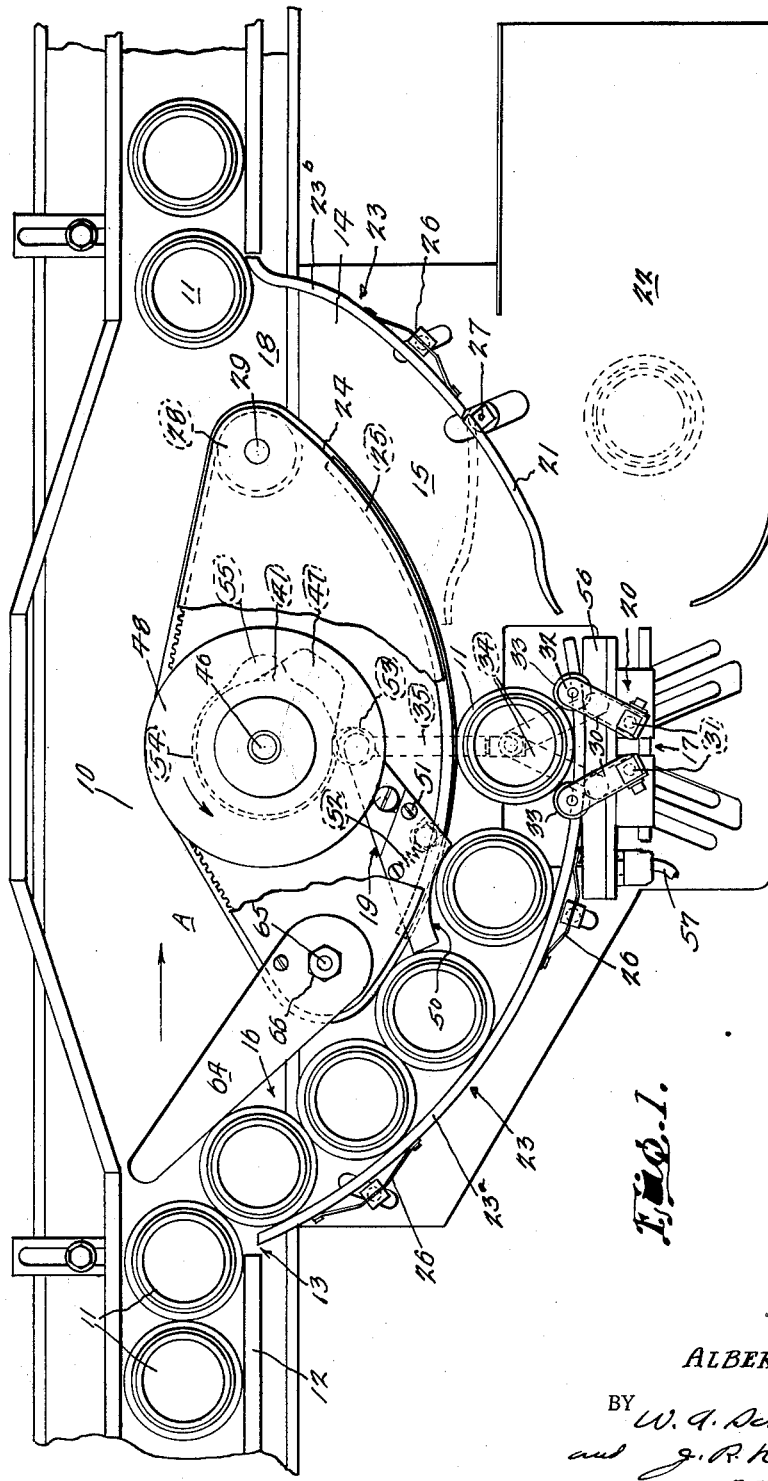
FIG. 1 is a top plan view of a jar handling apparatus embodying my invention, certain cover parts being omitted to reveal mechanism therebeneath.

My article handling apparatus A is shown attached to a conventional horizontal line conveyor 10 which may be an endless belt traveling continuously and driven by an electric motor (not shown) or the like power plant. The articles being handled are newly formed glass jars 11 which have just been annealed and require inspection, or gauging, prior to packaging for shipment to the manufacturer's customers. One side rail 12 (FIG. 1) along- side the conveyor is cut away in part to provide an opening 13 to accommodate the handling apparatus A.

This apparatus, in its illustrated embodiment, comprises a horizontal floor 14 for an arcuate path 15 along which jars 11 in normal upright positions move from an inlet 16 to an inspecting, or gauging station 17 and thence, if not seriously defective, to the exit end 18 where they return to the main conveyor. These jars are carried by the main conveyor 10 to a packing table, or accumulator table (not shown) where operators place them in shipping cartons. The jars 11 arrive at the inspecting station 17, one at a time, succeeding jars being held back out of contact with the lead jar by a stop arm 19, the operation of which is timed with actuation of a holder or cradle 20 at said station. Thus each jar being inspected, or gauged, may be rotated freely about its axis out of contact with any other jars. If the jar being inspected, or gauged, is found to be seriously defective, mechanism to be described, is actuated to project a pivoted jar discharge gate 21 across the normal path of travel of such jar, preventing return of same to the main conveyor. This gate, at the proper time, returns quickly to its normal position and transfers the defective article to a receiver table 22 from which it may be removed for analysis or desired disposition.

The arcuate path 15, along which the jars travel to and beyond the inspecting or gauging station is formed by a laterally flexible fence 23, or side rail, of arcuate contour and an endless belt 24 in part trained over an arcuate guide 25. This guide 25 is arranged concentric with and on a shorter radius than the fence 23 so that the belt in effect provides an inner wall for the path 15. The fence 23 may comprise two arcuate sections 23ª and 23ᵇ, each mounted upon yieldable spring brackets 26 and the aforementioned gate 21 which is of arcuate form and mounted upon a vertical hinge pin 27. As stated previously, this gate normally occupies the full line position of FIG. 1, so as to aid in guiding marketable merchandise back to the main conveyor 10, yet is shiftable to the dotted line position to deflect defective ware to the receiving table 22. These fence sections and the gate may be adjusted relative to the guide 25 for the belt 24 to vary the width of the path 15 to accommodate jars of different diameter. The belt 24 also functions to advance the jars along the path 15 and rotate them at the inspecting station 17.

Preferably this belt is trained over a pair of pulleys 28 (FIGS. 1 and 2) which are mounted on vertical shafts 29 at the inlet and exit ends of the arcuate path 15. One of these shafts 29 (FIG. 2) has a downward extension for connection with a speed reducer and electric motor (not shown) whereby to drive the belt continuously. Thus jars entering the path 15 are both advanced therealong and rotated continuously about their individual axes throughout their travel along said path as well as while held momentarily at the inspection station 17 by the cradle or holder 20.

Figure 2:
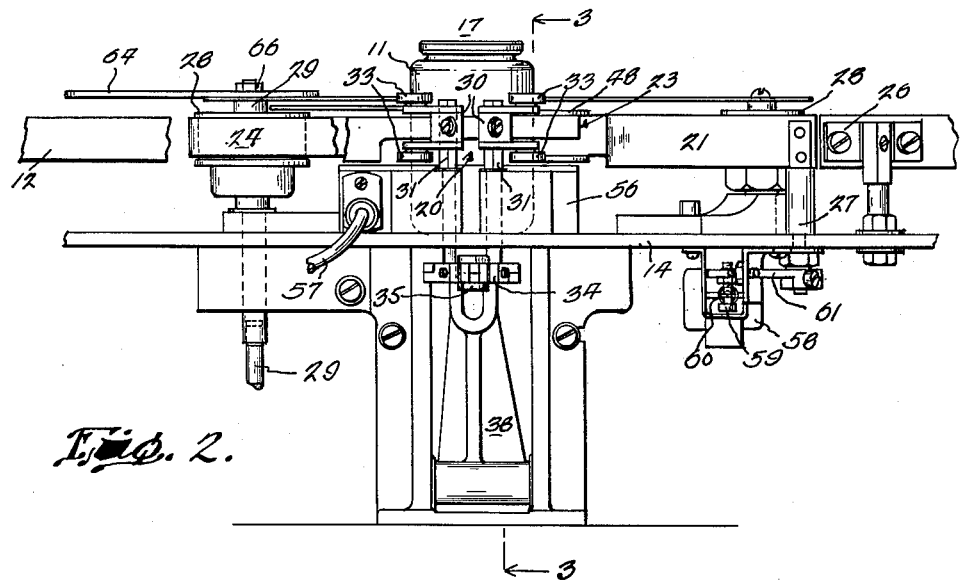
FIG. 2 is a front elevational view of the apparatus shown in FIG. 1.
Figure 3:
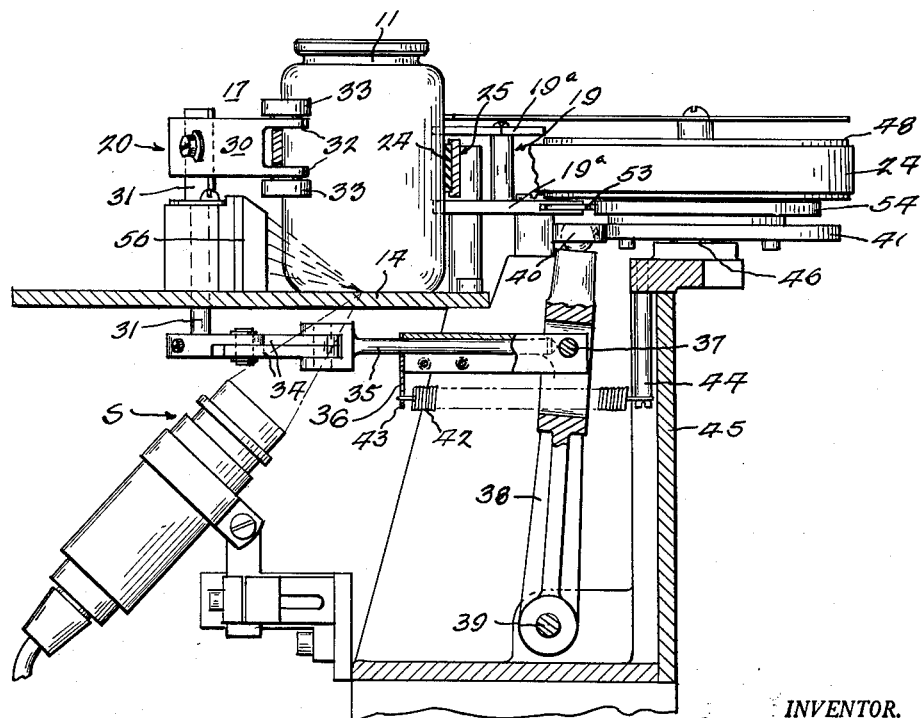
FIG. 3 is a vertical transverse sectional view with parts in elevation, taken substantially along the plane of lines 3—3 of FIG. 2 and adding thereto an electronic defect detector.
Figure 4:
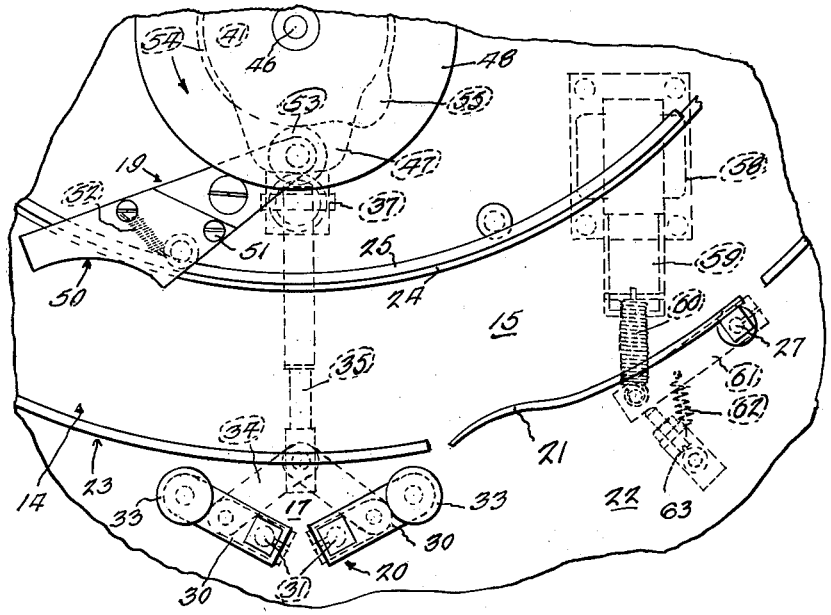
FIG. 4 is a fragmentary plan view illustrating the reject gate actuating means and the article stop arm actuating mechanism.
Figure 5:
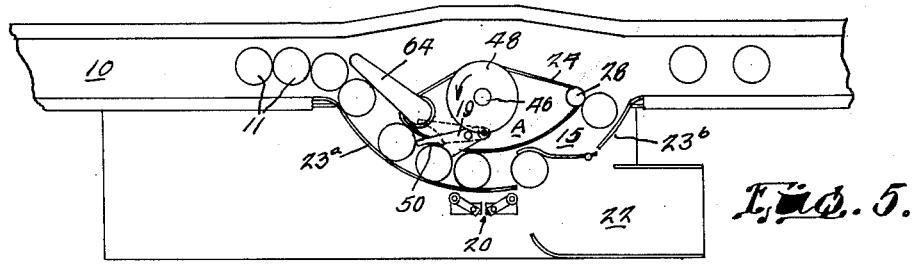
FIG. 5 is a top plan view more or less schematically showing the apparatus associated with a conventional conveyor, wherein one defective jar is about to be removed while the succeeding jar is approaching the inspecting station.

This cradle or holder in the illustrated embodiment may comprise a pair of pivoted horizontal arms 30 (FIGS. 1, 2 and 3), each mounted upon a vertical pivot pin 31. At its free end each arm is bifurcated to provide two superposed fingers 32 which carry rollers 33. These rollers, when the holder is restraining a jar momentarily, contact the exterior sides of the latter substantially as shown in FIGS. 1 and 3. Links 34 pivotally connect medial portions of the arms 30 and the outer end of a cam actuated horizonal push-rod 35. This push-rod 35 (FIGS. 1, 3 and 4) is slidingly mounted in the frame 36, having its inner end (FIG. 3) connected by a pivot pin 37 to a rocker-arm 38. This rocker-arm 38 is disposed generally vertically, being pivoted at its lower end to a pin 39 and at its upper end carrying a cam roll 40 which rides continuously upon the periphery of a rotary cam 41. A coil spring 42 connects a depending finger 43 on the push-rod 35 and a pin 44 carried by the base member 45 and functions to yieldingly hold the roll 40 against the cam 41, at all times.

This cam 41 (FIGS. 1, 3 and 4) is fixed to and rotates with a vertical shaft 46 and has a lobe 47 of proper contour and circumferential extent to move the push-rod 35 radially outward with each revolution of the cam. The spring 42 imparts reverse movement to the push rod to thereby close the cradle arms into holding contact with a jar. Rotation of this cam is effected by securing to the upper end of the shaft 46 a grooved pulley 48 over which one reach of the jar advancing and rotating belt 24 is trained. This belt rotates the cam 41 and pulley 48 thereabove in a counter-clockwise direction.

Figure 6:
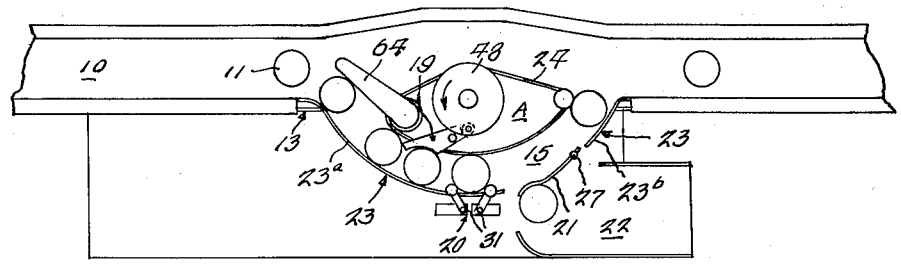
FIG. 6 is a view like FIG. 5 wherein the defective jar has been removed from the normal path and the succeeding jar is ready for gauging or inspection.

It is important that each jar while being held and rotated at the inspecting station be entirely out of contact with other jars, for very obvious reasons. Ac-accordingly, I provide the stop arm or finger 19 (FIGS. 1, 3 and 4), such being disposed horizontally and in part beneath the jar contacting reach of the belt 24. This arm comprises upper and lower interconnected bars 19a, each of which has an arcuate, jar accommodating pocket 50, or recess at its outer end designed to cooperate with a section of the opposed fence 23 in grasping a jar and holding it and all following contacting jars against advance, while a preceding jar is being inspected or gauged. This arm is pivoted to a vertical pivot pin 51 and by means of a coil pull spring 52 is normally urged to the full line projected position shown in FIGS. 1, 4 and 6. The inner end of this arm (FIGS. 1, 3 and 4) carries a cam roll 53 which rides continuously upon a horizontal rotary cam 54, under pressure exerted by said spring 52. The cam 54 is fixed to the vertical shaft 46 which carries the holder actuating cam 41, being provided with a lobe 55 so formed and positioned circumferentially relative to the lobe 47 of the other cam that, as the holder releases a jar, the stop arm likewise moves to one side and permits another single jar to advance to the holder or cradle. Thus it is apparent that with rotation of the cam shaft, jars are delivered seriatim to the holder and rotated while at the inspecting station, permitting inspection, or gauging, in conventional or any preferred fashion. In the event a defect is detected, a check bottom, for example, a light beam directed against such bottom by a light source S, is deflected toward a solar cell unit 56, the latter in conventional fashion being connected by a conductor 57 to an amplifier relay (not shown), such in turn connected to a gate actuating solenoid 58. This gate operating solenoid (FIGS. 2 and 4) is secured to the under-side of the floor 14 and the core extension rod 59 is connected by a coil pull-spring 60 to an arm 61 which is secured to the vertical gate supporting hinge pin 27. Thus, with energization of the solenoid, the gate 21 is moved to the dotted line position of FIG. 1 where it functions to interrupt normal advance of the just inspected jar along the path 15. A capacitor (not shown) in the circuit between the amplifier relay and solenoid causes momentary delay in return of the gate to its normal outermost position. It is understood that movement of a jar away from the holder terminates activity of the solar cell unit 56 so that ordinarily the solenoid would quickly be deenergized and the gate moved outwardly. The capacitor delays such motion long enough to insure positioning of the released jar in front of the gate. A coil spring 62 connects the arm 61 to an adjustable stop 63 and operates to snap the gate outwardly to the full line positions of FIGS. 1, 4 and 6, thereby quickly transferring the defective jar to the receiving table and so placing the gate that it cooperates with the other fence sections and belt in defining the arcuate path 15.

At the inlet end of the arcuate path 15 is a horizontal pivoted switch-arm 64, such being mounted upon a vertical pivot pin 65 and movable between the position indicated in FIG. 1 for directing jars from the main conveyor 10 to the inspecting or gauging apparatus A, and a position in which it will extend across the inlet end of said path and prevent jars from entering the arcuate path 15. A lock-nut 66 at the upper end of the hinge pin may be utilized to secure the switch-arm in either of its two positions.

Obviously modifications may be resorted to within the spirit and scope of the appended claims.

I claim:

1. Article handling apparatus comprising a generally arcuate horizontal floor extending between inlet and exit ends of the apparatus, there being a testing station between said ends, means for rotatively holding articles upright one at a time at said station, and a single means for both advancing articles in succession along said floor to the station and rotating them while being held at said station.

2. Apparatus as defined in claim 1, the article advancing means being a continuously driven belt positioned on edge and extending along one margin of the floor and a rail for holding articles supported on said floor in firm contact with the driven belt.

3. Apparatus as defined in claim 1 and means operating in timed relation to actuation of the article holding means for interrupting advance of articles along the floor to said station while a preceding article is being tested.

4. Apparatus as defined in claim 3, and cam controlled means for actuating both the article holding means and the article advance interrupting means.

5. Apparatus as defined in claim 4 and a plurality of cams on a common shaft for operating said cam controlled means.

6. Apparatus as defined in claim 1 and means intermediate the testing station and the exit end for removing defective articles.

7. Apparatus as defined in claim 1, there being a device at said testing station for detecting defects in the articles held at said station, and means intermediate said station and the exit end for removing defective articles.

8. Apparatus as defined in claim 7, the last named means being a horizontally swingable gate movable between one position in which it holds articles against the advancing means and another position in which it can deflect an article laterally away from said floor.

9. Apparatus as defined in claim 8, spring means normally yieldingly holding the gate in the first named position and solenoid controlled means operable in response to detection of a defect in an article for moving the gate to the article deflecting position.

10. In combination, a horizontal main conveyor for supporting articles in upright positions and carrying them past an article testing station provided near one side of the conveyor, a generally arcuate horizontal floor having inlet and exit ends at one side of the main conveyor, article holding and testing means intermediate said ends, article advancing means extending along one margin of said floor and article removing means positioned between the testing means and exit end operable in response to detection of a defect in an article while held at said station.

11. In a combination as defined in claim 10, the article removing means being a horizontally swingable gate, spring means yieldingly holding the gate in position to allow advance of articles to said exit end, and solenoid controlled means for moving the gate to a position across said floor.

12. A combination as defined in claim 10 and a shiftable deflector at the inlet end movable to close said inlet end to the entrance of articles.

13. A combination as defined in claim 10 and a shiftable stop for momentarily interrupting the advance of articles to said station while an article is being held at the latter.

14. A combination as defined in claim 13 and cam operated mechanism for actuating the article holding means and said stop.

15. In a combination as defined in claim 10, a shiftable stop for momentarily interrupting the advance of articles along said floor to the testing station, a pair of rotating cams, means actuated by one cam for shifting said stop and means actuated by the other cam for operating the article holder.

16. In combination, a horizontal main conveyor for supporting articles in upright position and carrying them past an article testing station provided near one side of the conveyor, a generally arcuate floor having inlet and exit ends at one side of the main conveyor, article holding and testing means intermediate said ends, means for advancing articles along said floor and a shiftable deflector at the inlet end movable to close said inlet whereby articles may move normally along the main conveyor.

17. The combination defined in claim 16, the deflector being a horizontally movable arm.

18. In combination, a horizontal main conveyor for supporting articles in upright position and carrying them in succession past an article testing station provided near one side of the main conveyor, a generally arcuate horizontal floor having inlet and exit ends at one side of the main conveyor, article holding and testing means intermediate said ends, a shiftable stop comprising an arm projectable into the path of articles between said inlet and the testing station to interrupt advance of articles along said floor during each testing cycle occurring at said station.

19. The combination defined in claim 18, there being cam-operated mechanism synchronized with the testing means operation to actuate said stop.

References Cited in the file of this patent

UNITED STATES PATENTS

| | | |
|---|---|---|
| 2,636,602 | Stoate | Apr. 28, 1953 |
| 2,902,151 | Miles | Sept. 1, 1959 |

FOREIGN PATENTS

| | | |
|---|---|---|
| 689,340 | France | Sept. 4, 1930 |